R. M. MARSHALL.
Making Confectionery.
No. 32,882.
Patented July 23, 1861.
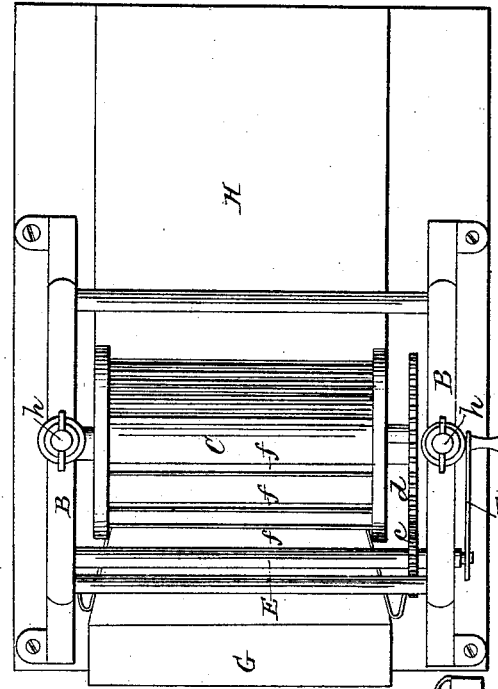
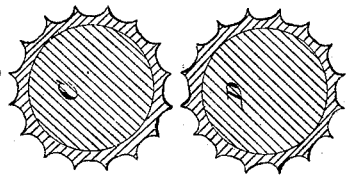
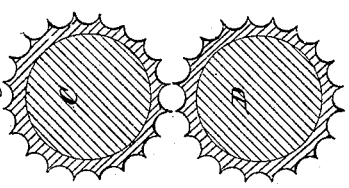
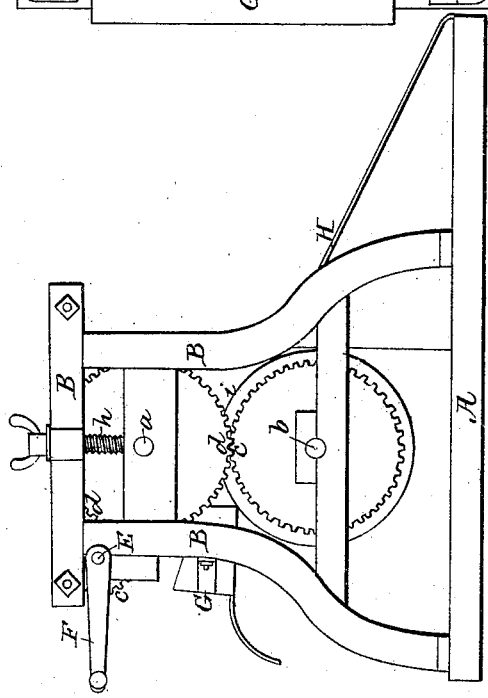
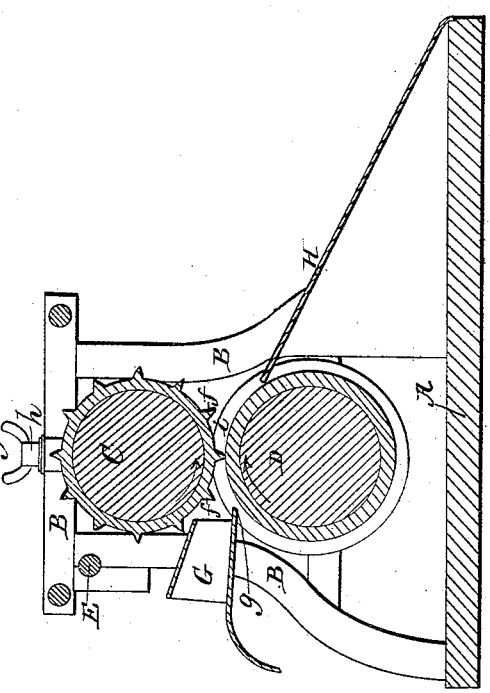
Witnesses.
Inventor.
Robert M. Marshall
By A. B. Stoughton. Atty

UNITED STATES PATENT OFFICE.

ROBERT M. MARSHALL, OF DAYTON, OHIO.

IMPROVEMENT IN MACHINES FOR ROLLING CANDY.

Specification forming part of Letters Patent No. 32,882, dated July 23, 1861.

*To all whom it may concern:*

Be it known that I, ROBERT M. MARSHALL, of Dayton, in the county of Montgomery and State of Ohio, have invented certain new and useful Improvements in Machines for Rolling, Impressing, and Cutting Candy into Sticks; and I do hereby declare the following to be a full, clear, and exact description of the same, reference being had to the accompanying drawings, making a part of this specification, in which—

Figure 1 represents a side elevation. Fig. 2 represents a top plan. Fig. 3 represents a vertical section through the machine in the line $xx$ of Fig. 2. Figs. 4 and 5 represent sectional views of some of the modifications of rollers that may be used.

Similar letters of reference, where they occur in the separate figures, denote like parts in all of them.

I am aware that in machines for making bread, biscuits, crackers, cakes, lozenges, and candies figuring, shaping, and cutting rollers have been used of various forms. These I do not claim independent of their arrangement and operation.

I am also aware that a candy-machine has been essayed through which a narrow strip of candy was passed to be rolled, stamped, and cut or marked into lengths. To such a machine I lay no claim, as it is too slow in its operation, and otherwise objectionable. In my machine the lengths of the sticks of candy to be cut are defined by the length of the rolls, and I can thus feed in a sheet of material from which the sticks are cut and shaped, instead of a narrow strip, and proportionately increase the capacity of the machine. My rolls separate the sticks from the sheets as to width, while the machines heretofore made separated them from a strip in length. In my machine one revolution of the rolls will form and separate a dozen or more sticks from the sheet, while the same sized rolls (in diameter) used, as in the machine above referred to, where the strips went through endwise, would not shape, form, and separate more than two, making an increase in the capacity of my machine of over six hundred per cent.; but this is not all, for when the strips going through lengthwise are severed into sticks, they tear and draw out, making ragged ends, while my sticks come out perfectly formed in every respect. I do not therefore claim passing long narrow strips of candy through between rolls to impress or cut them into lengths.

My invention consists in forming candy into sticks from a sheet of paste or dough as it passes between cutting and shaping or impressing rollers.

A is the base of the machine, upon which the uprights B are placed, said uprights having upon them suitable boxes or bearings for the journals $a\ b$ of the rollers C D to turn in.

E is a shaft supported in the side pieces, B, upon which a crank, E, or any other known mechanical appliance for turning it is placed to give motion to the rolls C D. Upon this shaft E there is a spur-gear, $c$, that meshes into and drives a gear, $d$, on the roller C, and through it the roller also, and the gear $d$ meshes with a similar gear, $e$, on the other roller, D, turning it, the two rolls turning toward each other at their front, or in the direction of the red arrows shown upon them. The roller C may be furnished with straight cutters $f$, extending the whole length of the roller, and the surface or perimeter of the roller D may be plain, the cutting-edges of $f$ just touching it, or so as to separate into sticks any paste or dough passed between them; or the rolls may have hemispherical grooves formed in them, as shown in Fig. 4, so as to separate the dough or paste into round sticks; or grooves of the form of those shown in Fig. 5 may be made; or, indeed, any other form of plaited, twisted, indented, or embossed candy may thus be made into sticks from the sheet of paste passing through between them, and they may be subdivided in length, so as to make cakes of any shape or size, by making the figure, shape, or ornamentation in reverse on the perimeter of the rollers or roller, as the case may be.

G is a mouth or hopper, into and through which the sheet of candy dough or paste is fed and passed to the rolls. This hopper in length is the same as the length of rolls between their flanges or ornamented surface or surfaces, so as to give proper width to the sheet of candy dough or paste, the width of said sheet designating the length of the sticks of candy cut therefrom, the apron $g$ of the mouth or hopper extending close up to the surface of one of the rolls. Behind the rolls there is a receiving-board, H, onto which the candy cut from the sheets passes, and from which it may be carried to or fall into any suitable receptacle, it being sufficiently cooled and hardened in passing over this receiver to prevent it from sticking. The board or plate H may be artificially cooled, if found necessary, by ice underneath or otherwise. The upper roll, C, is made adjustable in its housing or pillar blocks B by means of the set-screws $h$ or otherwise, for adjusting or regulating said roll with regard to its fellow to give the proper thickness to the sticks or pieces cut from the sheet; and the upper roll may have a recess at each end to receive a flange, $i$, on the under roll, the object of which is to prevent the candy dough or paste from being squeezed out at the ends of the rolls.

Having thus fully described the nature and object of my invention, and shown wherein it differs from other machines for a similar purpose, what I claim therein as new, and desire to secure by Letters Patent, is—

The cutting and impressing of sticks of candy from a sheet of candy dough or paste by an arrangement of rollers constructed and operating substantially as herein described and represented.

ROBT. M. MARSHALL.

Witnesses:
A. W. PINNEO,
JOSHUA OBLINGER.